US012645819B2

(12) United States Patent
Carroll et al.

(10) Patent No.: US 12,645,819 B2
(45) Date of Patent: Jun. 2, 2026

(54) MANAGEMENT OF MULTIPLE DIGITAL IDENTITIES USING A CENTRALIZED DISTRIBUTED LEDGER

(71) Applicant: Wells Fargo Bank, N.A., San Francisco, CA (US)

(72) Inventors: Matthew Carroll, Charlotte, NC (US); Marc Ward, Astoria, OR (US); Ann M. Kirk, Deerwood, MN (US); Bradford A. Shea, Mint Hill, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 357 days.

(21) Appl. No.: 18/393,227

(22) Filed: Dec. 21, 2023

(65) Prior Publication Data

US 2025/0209192 A1    Jun. 26, 2025

(51) Int. Cl.
*G06F 21/62*        (2013.01)

(52) U.S. Cl.
CPC .................................. *G06F 21/6218* (2013.01)

(58) Field of Classification Search
CPC ................................................. G06F 21/6218
USPC ............................................................ 726/4
See application file for complete search history.

(56) References Cited

U.S. PATENT DOCUMENTS

| 9,635,000 | B1 | | 4/2017 | Muftic | |
| 10,454,927 | B2 | * | 10/2019 | Oberhauser | .............. G06F 21/62 |
| 10,742,651 | B2 | * | 8/2020 | Clarke | .................. H04L 9/0637 |
| 10,931,650 | B1 | * | 2/2021 | McCown | .............. G06F 21/602 |
| 11,048,794 | B1 | * | 6/2021 | Bordow | ................ H04L 63/102 |
| 11,973,755 | B1 | * | 4/2024 | Bordow | .................. H04L 63/20 |
| 12,278,829 | B2 | * | 4/2025 | Toutain | .............. H04L 63/1416 |
| 12,401,650 | B1 | * | 8/2025 | Bell | ..................... G06F 21/6218 |
| 2016/0301689 | A1 | * | 10/2016 | Roy | .................... H04W 12/082 |
| 2019/0207951 | A1 | | 7/2019 | Oberhauser | |
| 2020/0162473 | A1 | | 5/2020 | Mercuri | |
| 2022/0058282 | A1 | | 2/2022 | Ricotta, Jr. | |
| 2023/0080599 | A1 | | 3/2023 | Rose | |
| 2023/0222243 | A1 | * | 7/2023 | Dunjic | ................ G06F 21/6245 |
| | | | | | 455/410 |

* cited by examiner

*Primary Examiner* — Dereena T Cattungal
(74) *Attorney, Agent, or Firm* — K&L Gates LLP

(57) ABSTRACT

Systems, apparatuses, methods, and computer program products are disclosed for digital identity selection. An example method includes detecting a digital identity selection event for a user, wherein the digital identity selection event is associated with an event attribute set comprising one or more event attributes, and an event criteria set comprising one or more event criteria. The example method further includes determining, based on the event attribute set, a master digital identity associated with the user, wherein the master digital identity comprises one or more user digital identities. The example method further includes generating, based on the master digital identity, one or more bespoke digital identities. The example method further includes selecting, using a digital identity selection model, an optimal digital identity, wherein the optimal digital identity satisfies the one or more event criteria of the event criteria set, and outputting the optimal digital identity.

20 Claims, 11 Drawing Sheets

500

Example Implementation of 304

304

Determine the one or more user parameter sets associated with each of the one or more user digital identities, wherein the one or more user parameter sets comprise one or more user parameters
502

306

Interactive Prompt 652

Please indicate the type of digital identity selection event for which you would like to generate a digital identity.

| Type 1 656 | Type 2 658 | Type 3 660 |

Please select the parameters you would like to include in this digital identity.

| Parameter | Y/N | Value (T/F) | Access Rule |
|-----------|-----|-------------|-------------|
| 1 | Y | T | Entity A-N, Secondary User B |
| 2 | N | - | - |
| 3 | N | - | - |
| 4 | Y | F | Entity A, Secondary Users C-F |
| (+) custom | - | - | - |

SUBMIT TO GENERATE 762

650

700

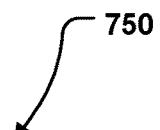

750

Selection Prompt 752

Hi John,

We have identified the following digital identities as being the most suitable for your transaction.

| Digital Identity | Name | Credit Card Information | Age |
|---|---|---|---|
| 1 | Y (true) | Y (true) | N |
| 2 | N | Y (true) | N |
| 3 | Y (false) | Y (true) | Y (false) |

Optimal Digital Identity Set 764

Please select and confirm the digital identity you would like to proceed with.

| Digital Identity 1 754 | Digital Identity 2 756 | Digital Identity 3 758 |
|---|---|---|

SUBMIT 760

MODIFY 762

FIG. 7B

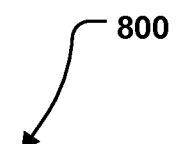

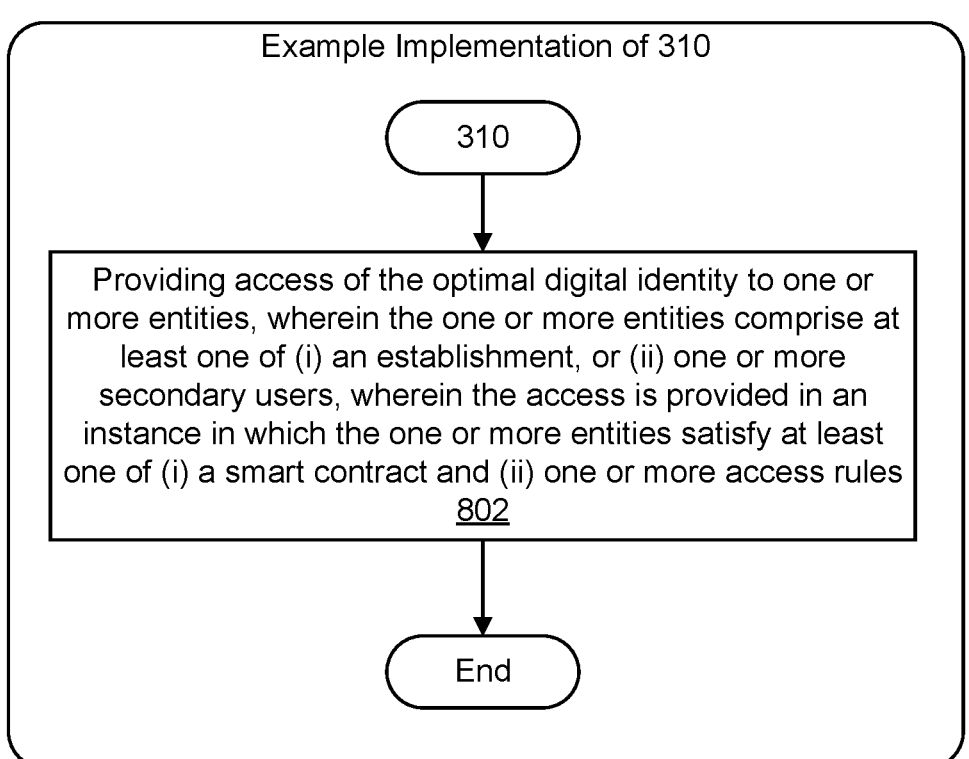

Example Implementation of 310

310

Providing access of the optimal digital identity to one or more entities, wherein the one or more entities comprise at least one of (i) an establishment, or (ii) one or more secondary users, wherein the access is provided in an instance in which the one or more entities satisfy at least one of (i) a smart contract and (ii) one or more access rules
802

End

FIG. 8A

MANAGEMENT OF MULTIPLE DIGITAL IDENTITIES USING A CENTRALIZED DISTRIBUTED LEDGER

BACKGROUND

Identity management apps may be used to help users manage their digital identities, secure logins, and access various platforms with features such as two-factor authentication or password management. The overarching goal of such software technologies is to provide users with control over their digital identities and enhance the security of their digital accounts.

BRIEF SUMMARY

The use of identity management apps has been increasing amongst users due to the growing digital environment, rising security concerns, proliferation of online accounts, and the convenience such systems offer in organizing and securing credentials across various platforms. While the prevalence of smartphones and the shift towards remote work post COVID-19 have further contributed to the widespread adoption of these apps, the full extent and applications of identity management apps are still being explored.

The consumer market for identity management apps is currently dominated by apps such Authy, LastPass, Microsoft Authentication, 1Password, Google Authenticator, etc. which offer users the ability to manage and select digital identities across various platforms. These applications lack the capability for users to adopt context-specific digital identities based on their environment. Consequently, users are forced to adopt a single, static identity that does not update based on the environment they are located in. Users may also find themselves providing unnecessary or sensitive information to entities, as these apps typically do not allow for dynamic adjustments of user parameters. This can lead to the unintentional disclosure of personal identifying information that may not be relevant to a particular digital identity use case, thereby posing privacy and security concerns. In addition, these apps lack the functionality to let users generate personalized digital identities for secondary users with whom users may need to share these digital identities. As such, there is a unique need for a technical solution that allows users to adapt digital identities based on the user's environment and also allows them to generate customized digital identities for secondary users, facilitating more granular control over shared information, ultimately mitigating unnecessary exposure of sensitive information and ensuring that access permissions align with specific needs and relationships. A solution of this nature would be intractable without a systematic and computer-based implementation. Accordingly, there is a latent technical need for systems that can automatically provide this capability.

Example implementations described herein provide a technical solution to this technical problem. Moreover, example implementations overcome the challenges that arise from the limitations of traditional identity management apps, providing users with the ability to adapt digital identities based on context, and generate unique, customized identities for secure sharing with entities. Example embodiments described herein use a digital identity selection system that, in response to the detection of a digital identity selection event for a user, is configured to determine an optimal digital identity for the user. Further, example embodiments deploy a digital identity selection model to select an optimal digital identity that satisfies the one or more event criteria of an event criteria set.

Accordingly, the present disclosure sets forth systems, methods, and apparatuses that enhance the flexibility and security of identity management apps for users. Generating an optimal digital identity set, wherein each digital identity is tailored for use in specific contexts, offers users increased confidence in managing their digital presence across various platforms. This adaptability proves particularly advantageous in terms of maintaining user privacy, control, and security, and surpasses the capabilities of traditional manual identity management systems.

In one example embodiment, a method is provided for detecting, by detection circuitry, a digital identity selection event for a user, wherein the digital identity selection event is associated with an event attribute set comprising one or more event attributes, and an event criteria set comprising one or more event criteria. The method further includes, determining, by a multimodal engine and based on the event attribute set, a master digital identity associated with the user, wherein the master digital identity comprises one or more user digital identities. The method further includes generating, by the multimodal engine and based on the master digital identity, one or more bespoke digital identities. The method further includes selecting, by a selection engine and using a digital identity selection model, an optimal digital identity, wherein the optimal digital identity satisfies the one or more event criteria of the event criteria set, and outputting, by communications hardware, the optimal digital identity.

In another example embodiment, an apparatus is provided for digital identity selection. The apparatus includes detection circuitry configured to detect a digital identity selection event for a user, wherein the digital identity selection event is associated with an event attribute set comprising one or more event attributes, and an event criteria set comprising one or more event criteria. The apparatus further includes a multimodal engine configured to determine, based on the event attribute set, a master digital identity associated with the user, wherein the master digital identity comprises one or more user digital identities. The multimodal engine is further configured to generate, based on the master digital identity, one or more bespoke digital identities. The apparatus further includes a selection engine configured to select, using a digital identity selection model, an optimal digital identity, wherein the optimal digital identity satisfies the one or more event criteria of the event criteria set. The apparatus further includes communications hardware configured to output the optimal digital identity.

In another example embodiment, a computer program product is provided for digital identity selection. The computer program product comprising at least one non-transitory computer readable storage medium storing software instructions that, when executed, cause an apparatus to detect a digital identity selection event for a user, wherein the digital identity selection event is associated with an event attribute set comprising one or more event attributes, and an event criteria set comprising one or more event criteria. The at least one non-transitory computer readable storage medium storing software instructions that, when executed, cause an apparatus to determine, based on the event attribute set, a master digital identity associated with the user, wherein the master digital identity comprises one or more user digital identities. The at least one non-transitory computer readable storage medium storing software instructions that, when executed, cause an apparatus to generate, based on the master digital identity, one or more bespoke digital identities. The at least one non-transitory computer readable storage medium storing software instructions that, when executed, cause an apparatus to select, using a digital identity selection model, an optimal digital identity, wherein the optimal digital identity satisfies the one or more event criteria of the event criteria set, and output the optimal digital identity.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 7B illustrates an example user interface illustrating a selection prompt used in some example embodiments described herein.

FIG. 8A illustrates an example flowchart for outputting the optimal digital identity, in accordance with some example embodiments described herein.

DETAILED DESCRIPTION

Figure 1:
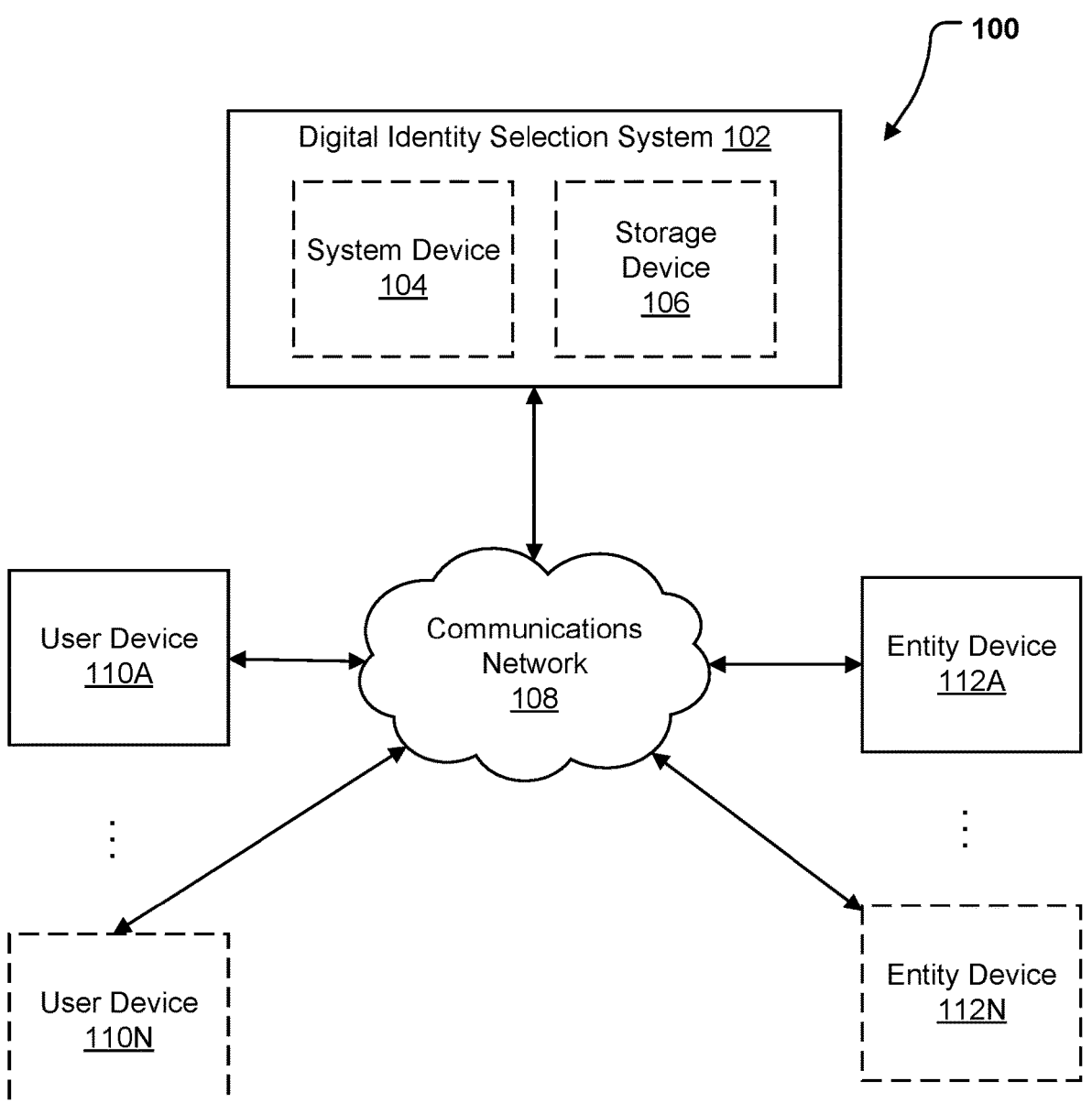
FIG. 1 illustrates a system in which some example embodiments may be used for digital identity selection.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "digital identity selection event" may refer to a digital identity use-case, wherein a user may use a digital identity event for a particular purpose. In other words, a digital identity selection event represents a practical scenario or application within the context of digital identity usage. Examples of digital identity selection events may include online purchases, healthcare interactions, government services, educational transactions, social media login, travel verification, and/or the like.

The term "event attribute set" may refer to a comprehensive assortment of event attributes associated with a digital identity selection event. The event attribute set may encompass one or more event attributes pertaining to the user, the entity, the type of digital identity selection event, and/or the like.

The term "event attributes" may refer to distinct characteristics or properties associated with a particular occurrence, specifically within the context of a digital identity selection event. The event attributes may serve to encapsulate relevant information such as entity type, user classification, time stamp of the digital identity selection event, purpose or intent for which a digital identity must be selected, authorization level, device information, and/or the like.

The term "event criteria set" may refer to a delineated collection of criteria linked to an entity that is slated to receive a user's digital identity. Within this context, the entity establishes its own set of event criteria, specifying the requisite attributes and user parameters the user digital identities must possess to be deemed acceptable. The event criteria set may serve as the standard against which user digital identities are assessed for compatibility and adherence, ensuring alignment with an entity's requirements and expectations during a digital identity selection event.

The term "event criteria" may refer to the specific and predefined set of conditions, attributes or parameters established by an entity to evaluate and determine the suitability and acceptance of user digital identities within the context of a digital identity selection event. Examples of event criteria may include (i) parameter validation, wherein a user digital identity must include verified parameters (e.g., name, date of birth, address), (ii) authentication level, wherein a user digital identity should meet a specific level of authentication (e.g., multi-factor authentication), (iii) authorization scope, wherein a user digital identity must have the necessary authorization level to perform a specific action or access particular information, (iv) device trustworthiness, wherein a user digital identity must be access from a trusted or secure device, (v) time sensitivity, wherein a user digital identity must be used within a certain time frame, (vi) geographical restrictions, wherein the user digital identity may be subject to event criteria specifying acceptable geographical locations for usage, (vii) purpose alignment, wherein a user digital identity should align with the purpose of the digital identity selection event, and/or the like.

The term "master digital identity" may refer to a comprehensive digital identity encompassing the entirety of user digital identities and bespoke digital identities, along with the complete array of authenticated user parameters associated each of these constituent digital identities. In other words, a master digital identity may refer to an aggregate digital representation of a user that consolidates the authenticated user parameters derived from the user digital identities and bespoke digital identities within a unified and overarching digital identity framework.

The term "user digital identities" may refer to may refer to a stored representation of an individual's identity within a digital environment. In some embodiments, the user digital identity may encompass user parameters such as unique identifiers, authentication credentials, and associated personal information that allows the user to interact with one or more entities. A user digital identity may be pre-existing or may be created by the user, wherein the user digital identity created by the user is a bespoke digital identity.

The term "bespoke digital identities" may refer to personalized digital identity constructs customized by users, wherein users specify the inclusion of user parameters within the bespoke digital identity. In particular, in some embodiments, the generation of a bespoke digital identity may involve a user determining whether each user parameter should be incorporated in its authentic, verifiable state or using an obfuscated representations.

The term "optimal digital identity" may refer to the user digital identity that satisfies the predefined conditions and event criteria specified within an associated event criteria set.

The term "data environment" may refer to may refer to a structured or unstructured collection of distinct digital contexts or repositories within which user-related information, particular user digital identities may be stored. In some embodiments, the data environment may encompass various sources such as online platforms, applications, databases, or interconnected systems, each containing relevant data pertaining to a user digital identity.

The term "user parameter sets" may refer to a structured or unstructured compilation of user parameters specific to a user. Each user digital identity and bespoke digital identity may comprise a user parameter set, representing distinct elements of information associated with the user, such as personal details, authentication credentials, and other pertinent parameters essential for identification and interaction with entities during a digital identity selection event.

The term "user parameters" may refer to the distinct elements of information constituting a user parameter set associated with a user digital identity of a user. User parameters may comprise a variety of parameters that contribute to the identification, authentication, and contextualization of the user. Examples of user parameters may include personal information (e.g., name, date of birth, gender), authentication credentials (e.g., username, password, pin), contact information (e.g., email information, phone number, physical address), biometric data (e.g., fingerprint, facial recognition data), educational information (e.g., student ID, academic achievements, enrolled courses), financial data (e.g., bank account details, credit card information), health-related attributes (e.g., blood type, medical history, allergies), and/or the like. The user parameters may be assigned a status designation of "authentic" or "obfuscated" as specified by the user for inclusion in the user parameter set of a particular user digital identity.

The term "user response" may refer to the response provided by a user to an interactive prompt. The user response includes one or more bespoke parameter sets, each comprised of one or more bespoke parameters. Within this context, each bespoke parameter is assigned a distinct status designation, as defined by the user's input during the interactive process.

The term "interactive prompt" may refer to a user interface element or system feature designed to facilitate user engagement, wherein users are afforded the capability to generate, and configure bespoke digital identities. This interactive mechanism allows users to define the characteristics for a particular bespoke parameter set and assign specific status designations to each bespoke parameter.

The term "bespoke parameter sets" may refer to a tailored collection of distinctive and user-defined attributes organized within a digital framework. The bespoke parameter set may comprise individual bespoke parameters, each possessing unique characteristics, and, when combined, forming a comprehensive bespoke parameter set configured by the user to meet specific requirements or preferences for a digital identity selection event. For instance, in a social media platform, a user's bespoke parameter set may include preferences for digital identity privacy settings.

The term "bespoke parameters" may refer to the individual, user-defined attributes, representing specific elements of information or configuration chosen and customized by the user. Each bespoke parameter may be characterized by its own unique properties and values, allowing users to tailor their digital experience according to their preferences. Examples of bespoke parameters may include (i) privacy level: values—public, private, limited to connections, (ii) authentication preferences: values—multifactor authentication, biometric authentication, password-only, (iii) identity verification level: values—basic, standard, enhanced, (iv) data sharing consent: values—opt-in, opt-out, customized data sharing, and/or the like.

The term "status designation" may refer to categorizing a specific user parameter or a specific bespoke parameter as either possessing an authentic value or employing an obfuscated representation. This classification may be a deliberate decision made by the user to designate the current state or condition of the parameter within a digital identity, aligning with privacy preferences or specific criteria set by the user for a particular digital identity selection event.

The term "optimal digital identity set" may refer to a set that encompasses both the user digital identities and bespoke digital identities that meet the predefined conditions outlined in the event criteria set for a particular digital identity selection event.

The term "selection response" may refer to the response provided by a user in response to a selection prompt. The selection response includes an optimal digital identity selected by the user from the optimal digital identity set presented in the selection prompt.

The term "selection prompt" may refer to a prompt presented to a user that includes an optimal digital identity set. The selection prompt may present the users with the various user digital identities and bespoke digital identities that constitute the optimal digital identity set, allowing the user to choose a specific digital identity from the provided set.

The term "entities" may refer to one or more establishments that provide goods or services (e.g., business entity, organization, commercial entity). In some embodiments, the establishment may refer to the entities with which users interact and engage in transactions for a particular digital identity selection event. In some embodiments, entities may also refer to one or more secondary users designated to receive the outputted optimal digital identity. The one or more secondary users may be a designated individual, explicitly included by the user in predefined access rules that authorizes the one or more secondary users to receive and utilize a digital identity associated with the user.

The term "smart contract" may refer to a self-executing and programmable digital contract that may operate on blockchain technology. The smart contract may automate the terms and conditions for using a digital identity. Smart contract may be coded with predefined rules, conditions, and actions that execute automatically when specified conditions are met.

The term "access rules" may refer to a set of user-defined conditions that dictate the permissions and restrictions associated with the utilization of the user's digital identities. The access rules may delineate who, under what circumstances, and to what extent can access specific digital identities and use them for a specific digital identity selection event.

The term "access request" may refer to a formal request originating from one or more entities, indicating their desire to obtain access to the one or more user digital identities or to the one or more bespoke digital identities. The access request may serve as the formal communication expressing the entities' intent to utilize or interact with the specified digital identities, subject to user approval or user denial.

The term "access response" may refer to a formal response to an access request that encompasses the user's decision to either approve or deny the access request. The access response may be initiated by the user, signifying their authorization or rejection or the access request made by one or more entities, thereby dictating whether the requested access to user digital identities or bespoke digital identities may be granted or declined.

System Architecture

Example embodiments described herein may be implemented using any of a variety of computing devices or servers. To this end, FIG. 1 illustrates an example environment 100 within which various embodiments may operate. As illustrated, a digital identity selection system 102 may include a system device 104 in communication with a storage device 106. Although system device 104 and storage device 106 are described in singular form, some embodiments may utilize more than one system device 104, more than one storage device 106, and/or the like. Some embodiments of the digital identity selection system 102 may not require a system device 104 and/or storage device 106 at all. Whatever the implementation, the digital identity selection system 102 may receive and/or transmit information via communications network 108 (e.g., the Internet) with any number of other devices, such as one or more of user devices 110A-110N and/or entity devices 112A-112N. A user device 110A-110N may include tablets, phones, laptops, whereas an entity device 112A-112N may be a device associated with an entity that stores data for the entity.

The digital identity selection system 102 may be implemented as one or more computing devices or servers, which may be composed of a series of components. Particular components of the digital identity selection system 102 are described in greater detail below with reference to apparatus 200 in connection with FIG. 2.

In some embodiments, the digital identity selection system 102 further includes a storage device 106 that comprises a distinct component from other components of the digital identity selection system 102. Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 110 may host the software executed to operate the digital identity selection system 102. Storage device 106 may store information relied upon during operation of the digital identity selection system 102, such as a user response to an interactive prompt or a selection response to a selection prompt that may be used by the digital identity selection system 102, data and documents to be analyzed using the digital identity selection system 102, or the like. In addition, storage device 106 may store control signals, device characteristics, and access credentials enabling interaction between the digital identity selection system 102 and one or more of the user devices 110A-110N or entity devices 112A-112N.

The one or more user devices 110A-110N and the one or more entity devices 112A-112N may be embodied by any computing devices known in the art. The one or more user devices 110A-110N and the one or more entity devices 112A-112N need not themselves be independent devices, but may be peripheral devices communicatively coupled to other computing devices.

Although FIG. 1 illustrates an environment and implementation in which the digital identity selection system 102 interacts indirectly with a user via one or more of user devices 110A-110N and/or entity devices 112A-112N, in some embodiments users may directly interact with the digital identity selection system 102 (e.g., via communications hardware of the digital identity selection system 102), in which case a separate user devices 110A-110N and/or entity devices 112A-112N may not be utilized. Whether by way of direct interaction or indirect interaction via another device, a user may communicate with, operate, control, modify, or otherwise interact with the digital identity selection system 102 to perform the various functions and achieve the various benefits described herein.

Example Implementing Apparatuses

Figure 2:
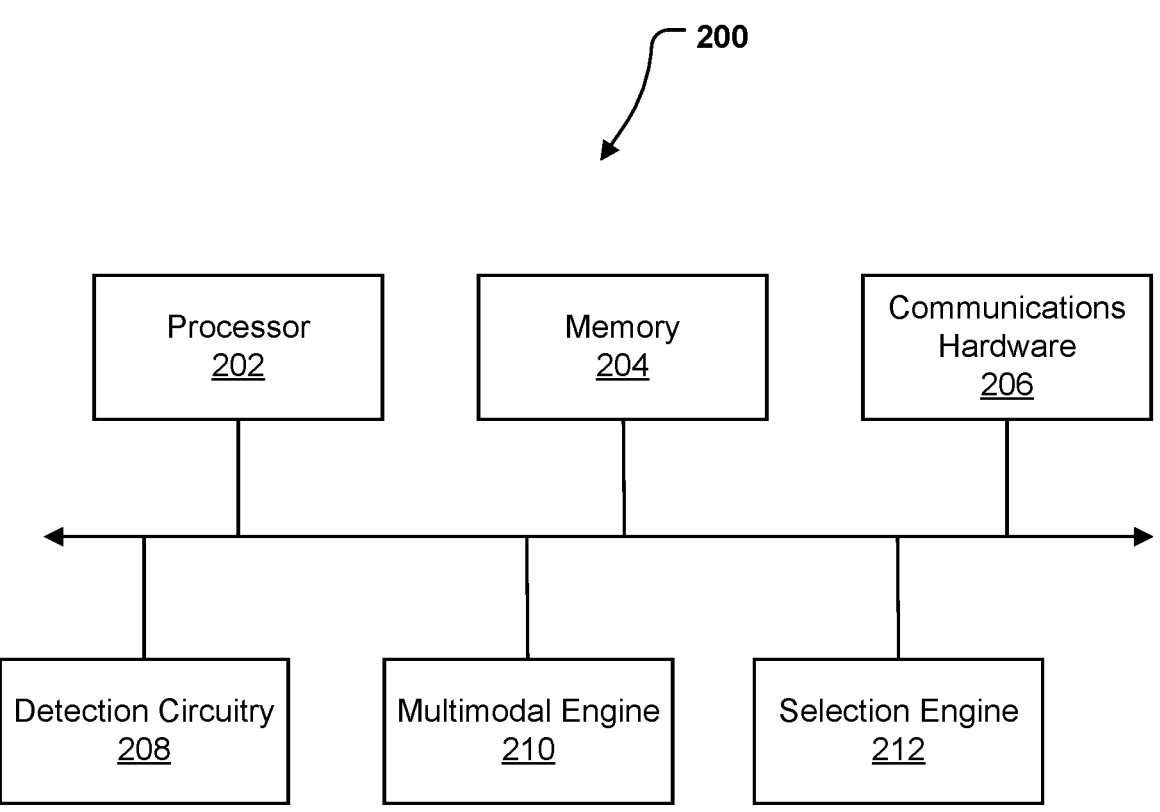
FIG. 2 illustrates a schematic block diagram of example circuitry embodying a system device that may perform various operations in accordance with some example embodiments described herein.

The digital identity selection system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 4-8B. As illustrated in FIG. 2, the apparatus 200 may include processor 202, memory 204, communications hardware 206, detection circuitry 208, multimodal engine 210, and selection engine 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises detection circuitry 208 that detects a digital identity selection event for a user, wherein the digital identity selection event is associated with an event attribute set comprising one or more event attributes, and an event criteria set comprising one or more event criteria. In some embodiments, the detection circuitry 208 may be configured to extract the one or more event attributes and the one or more event criteria from a data environment, and generate the event attribute set and the event criteria set. The detection circuitry 208 may utilize processor 202, memory 204, or any other hardware component included in the apparatus 200 to perform these operations, as described in connection with FIGS. 3-4 below. The detection circuitry 208 may further utilize communications hardware 206 to gather data from a variety of sources (e.g., user devices 110A through user devices 110N or storage device 106, as shown in FIG. 1), and/or exchange data with a user.

In addition, the apparatus 200 further comprises a multimodal engine 210 that (i) determines a master digital identity associated with the user, wherein the master digital identity comprises one or more user digital identities, and (ii) generates one or more bespoke digital identities based on the master digital identity. In some embodiments, the multimodal engine 210 may be configured to identify the one or more user parameter sets associated with each of the one or more user digital identities, wherein the one or more user parameter sets comprise one or more user parameters. In some embodiments, the multimodal engine 210 may be configured to generate, based on the user response and using the digital identity selection model, the one or more bespoke digital identities. The multimodal engine 210 may utilize processor 202, memory 204, or any other hardware component included in the apparatus 200 to perform these operations, as described in connection with FIGS. 3, 5-6B, 8B below. The multimodal engine 210 may further utilize communications hardware 206 to gather data from a variety of sources (e.g., user devices 110A-110N or entity devices 112A-112N, as shown in FIG. 1), and/or exchange data with a user.

Further, the apparatus 200 further comprises a selection engine 212 that selects an optimal digital identity using a digital identity selection model, wherein the optimal digital identity satisfies the one or more event criteria of the event criteria set. In some embodiments, the selection engine 212 may be further configured to generate an optimal digital identity set using the digital identity selection model, wherein the optimal digital identity set comprises (i) the one or more user digital identities that satisfy the event criteria set and (ii) the one or more bespoke digital identities that satisfy the event criteria set. The selection engine 212 may utilize processor 202, memory 204, or any other hardware component included in the apparatus 200 to perform these operations, as described in connection with FIGS. 3, 7A-7B below. The selection engine 212 may further utilize communications hardware 206 to gather data from a variety of sources (e.g., user devices 110A-110N or entity devices 112A-112N, as shown in FIG. 1), and/or exchange data with a user.

Although components 202-212 are described in part using functional language, it will be understood that the particular implementations necessarily include the use of particular hardware. It should also be understood that certain of these components 202-212 may include similar or common hardware. For example, the detection circuitry 208, multimodal engine 210, and selection engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the detection circuitry 208, multimodal engine 210, and selection engine 212 may leverage processor 202, memory 204, or communications hardware 206 as described above, it will be understood that any of detection circuitry 208, multimodal engine 210, and selection engine 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that detection circuitry 208, multimodal engine 210, and selection engine 212 comprise particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

Example Operations

Turning to FIGS. 3-8B, example flowcharts and graphical user interfaces are illustrated that contain example operations implemented by example embodiments described herein. The operations illustrated in FIGS. 3-8B may, for example, be performed by system device 104 of the digital identity selection system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, detection circuitry 208, multimodal engine 210, selection engine 212, and/or any combination thereof. It will be understood that user interaction with the digital identity selection system 102 may occur directly via communications hardware 206, or may instead be facilitated by a separate user device 110A-110N or entity device 112A-112N, as shown in FIG. 1, and which may have similar or equivalent physical componentry facilitating such user interaction.

Figure 3:
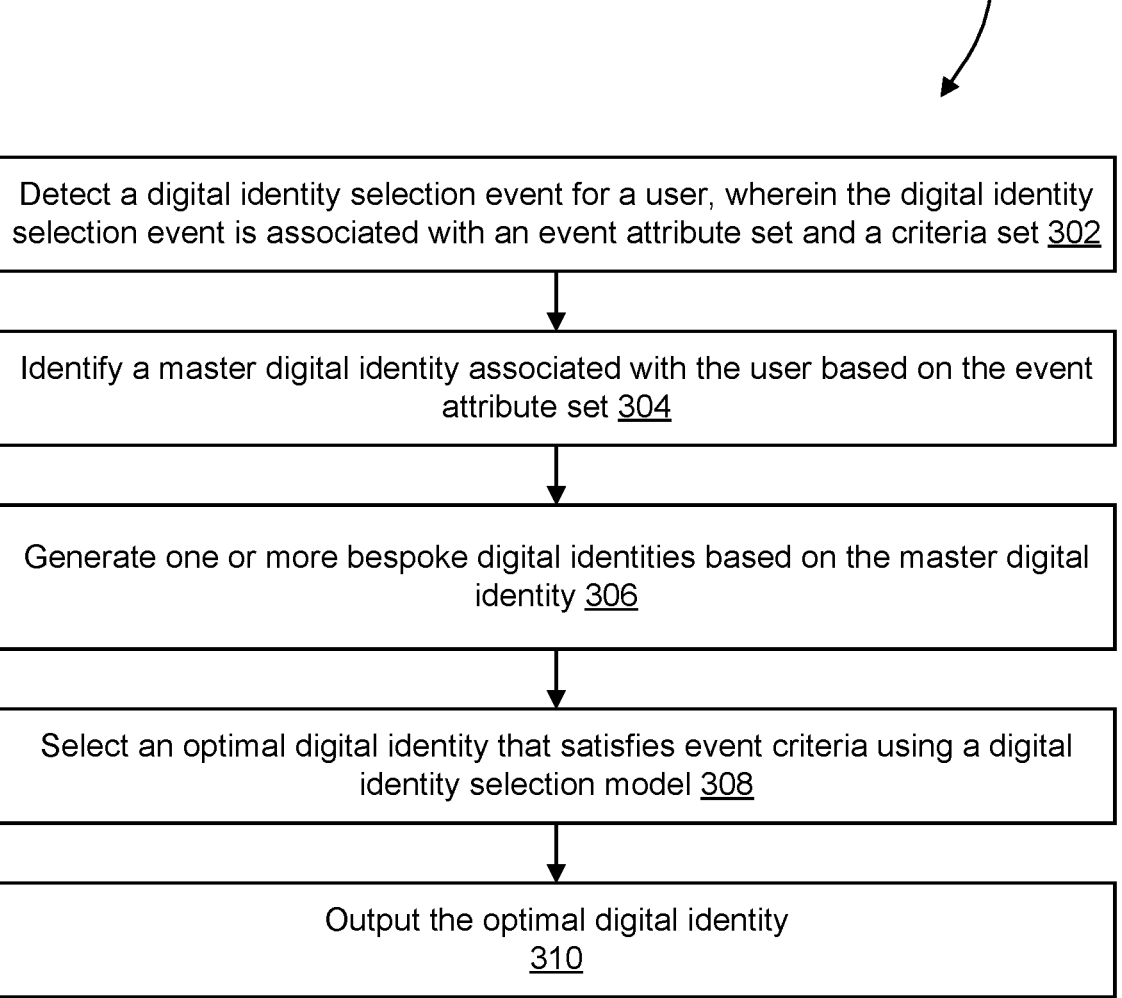
FIG. 3 illustrates an example flowchart for digital identity selection, in accordance with some example embodiments described herein.

Turning first to FIG. 3, a procedure 300 illustrates example operations for digital identity selection for a user during a digital identity selection event. Digital identity selection events may encompass a diverse range of scenarios where users may find value in using distinct digital identities. Consider a user going to the gym, where they may prefer a digital identity focused solely on health and fitness-related information to maintain privacy. Alternatively, when attending a movie, a user may use another digital identity storing only payment-related, and excluding personal identifying information (e.g., date of birth). This approach enables users to tailor their digital personas to specific contexts, providing a nuanced layer of privacy and control. It prevents unnecessary data exposure and ensures that information shared aligns precisely with the requirements of each unique situation, thereby fostering a more secure and personalized digital experience for users across various aspects of their lives.

As shown by operation 302, the apparatus 200 includes means, such as processor 202, memory 204, communications hardware 206, detection circuitry 208, or the like, for detecting a digital identity selection event for a user, wherein the digital identity selection event is associated with an event attribute set comprising one or more event attributes, and an event criteria set comprising one or more event criteria. An event attribute set may comprise event attributes that define the context and specifics of a digital identity selection event, allowing users to select or generate an optimal digital identity based on the various event attributes associated with each digital identity selection event. Examples of event attributes may include: (i) event type (e.g., gym visit, movie outing, bank transaction), (ii) location (e.g., gym address, movie theatre location, bank branch address), (iii) time stamp (e.g., date and time of gym visit, movie show time, bank transaction time), (iv) transaction type (e.g., workout session, movie genre, banking operation such as withdrawal or deposit), (v) device information (e.g., laptop, tablet, phone), (vi) access permissions (e.g., specific permissions for each event type), and/or the like. An event criteria set may comprise one or more specific event criteria that an entity requires from a digital identity provided by a user during a digital identity selection event. These event criteria represent the minimum information or attributes that the entity needs to fulfill its requirements or process the user's interaction appropriately. Each event criterion within the event criteria set may specify a particular piece of information of characteristic necessary for the entity to effectively engage with the user's digital identity in the context of a given digital identity selection event. Examples of event criteria that may be a part of an event criteria set include: (i) age criterion, wherein the user's age is required by the entity to determine eligibility for certain content or services such as financial transactions, (ii) location criterion, wherein the geographical location of the user is needed for context-specific services such as regional banking information, (iii) transaction amount criterion, wherein the minimum or maximum transaction amount may be a critical criterion to ensure compliance with financial regulations, (iv) health information, wherein any medical conditions must be disclosed to a gym operator, (v) authentication level criterion, wherein the required level of authentication (e.g., multi-factor authentication) may be a criterion for events including sensitive transactions, and/or the like.

In some embodiments, the detection circuitry 208 may use tools such as IP address tracking, browser cookies and session data, device fingerprinting, and login and authentication records to track user presence within a digital environment (e.g., website). The detection circuitry 208 may function in response to a detection algorithm initialized by the processor 202. The processor 202 may also allocate computational resources and activate the necessary system components for digital identity selection event data acquisition, may manage the real-time processing of incoming data and may execute pattern recognition algorithms to (i) identify signals indicative of a digital identity selection event, (ii) assess the validity of the detected signals, (iii) filter noise, (iv) and trigger subsequent system-wide actions based on predefined criteria.

In some embodiments, an entity database may be maintained in an associated memory, such as memory 204, and may include one or more entity profiles. In instances where the entity refers to an establishment, each entity profile may uniquely correspond to a particular establishment and may include a repository comprising one or more of the products or services offered by the establishment. Detection circuitry 208 may also use tools, such as web-crawlers, optical character recognition techniques, natural language processing techniques and/or the like to identify the one or more products or services offered by an establishment, and accordingly update the entity profile.

In order to detect a digital identity selection event, the detection circuitry 208 may analyze a range of data to identify the entity and determine the type of the digital identity selection event. The detection circuitry 208 may classify the digital identity selection event as physical or digital based on the data source and context, and may also sub-categorize the users as being primary users or secondary users. A primary user may refer to an individual directly linked to user digital identities, while a secondary user may refer to an individual authorized by the primary user to access those user digital identities. In instances wherein the digital identity selection event involves a physical user presence at an entity, the detection circuitry 208 may use communications hardware 206 (e.g., Wi-Fi, Bluetooth beacons, RFID tags), to track user devices 110A-110N within the entity's range of location. The detection circuitry 208 may also analyze signal strength and user device proximity to determine physical presence. Alternatively, the digital identity selection event may occur on an online platform, wherein the detection circuitry 208 may process HTTP logs, or employ web analytics and tracking tools for digital identity selection event detection. In some embodiments, memory 204 may store digital identity selection event data, such as device IDs, timestamps of a user visit, session URL details of URLs, and/or the like.

Figure 4:
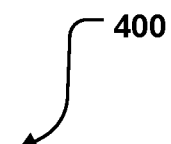
FIG. 4 illustrates an example flowchart for detecting a digital identity selection event, in accordance with some example embodiments described herein.
Figure 4:
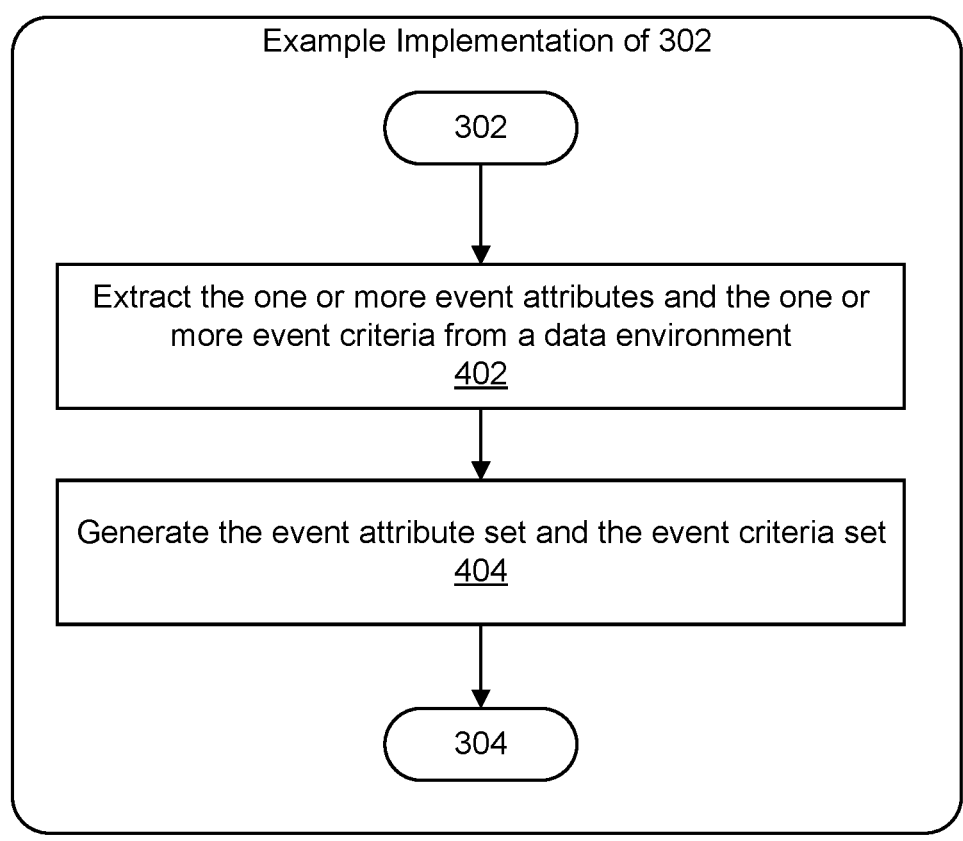

In some embodiments, operation 302 may be performed in accordance with the operations described in FIG. 4.

Turning now to FIG. 4, a procedure 400 illustrates example operations for detecting a digital identity selection event for a user, wherein the digital identity selection event is associated with an event attribute set comprising one or more event attributes, and an event criteria set comprising one or more event criteria.

As shown by operation 402, the apparatus 200 includes means, such as processor 202, memory 204, communications hardware 206, detection circuitry 208, or the like, for extracting the one or more event attributes and the one or more event criteria from a data environment. Upon detection of the digital identity selection event, the communications hardware 206 may access a memory, such as memory 204, to deploy a selection event data extraction algorithm that is configured to extract event attributes and event criteria from a data environment. In some embodiments, the selection event extraction algorithm may comprise a set of instructions that specify how to access, retrieve, and/or store digital identity selection event data (e.g., historical user digital identities, duration of digital identity selection event, interaction events, search queries, device information, unique user identifiers, geographic location data, transaction history, custom filters, etc.), and/or the like. In example embodiments, the selection event data extraction algorithm may include parameters such as (i) data source locations (e.g., relational databases such as MySQL, cloud storage such as Google Cloud, API endpoints, file systems, social media platforms, etc.), (ii) data format specifications (e.g., JavaScript object notation (JSON), extensible markup language (XML), comma-separated values (CSV), database schema, etc.), (iii) extraction criteria, and/or the like.

The digital identity selection event data may be collected and/or received from various devices, such as any one of user devices 110A-110N or entity devices 112A-112N. In an instance in which a user re-visits an entity, the historical digital identity selection event data may also be retrieved from memory 204 for further analysis and use during the current digital identity selection event. In example embodiments, a digital identity selection model may also be used to determine the parameters relevant for extracting specific event attributes and event criteria.

Via communications hardware 206, the detection circuitry 208 may establish connections to the designated data sources (e.g., any one of the user devices 110A-110N and/or entity devices 112A-112N) and authenticate itself to gain access to the data environment, ensuring compliance with security protocol and permissions. The detection circuitry 208 may query the data environment based on the criteria defined by the selection event extraction algorithm and employ processor 202 to process the extracted event attributes and event criteria in real-time. Data processing by the processor 202 may involve cleaning, transforming, and/or organizing the event attributes and event criteria for storage in memory 204. Upon completion of the extraction operation, the detection circuitry 208 may provide the extracted event attributes and event criteria to the communications hardware 206 for further processing or analysis.

In some embodiments, the detection circuitry 208 may use any suitable techniques such as NPL, OCR, or may further, use a pre-processing model, such as a neural network (e.g., a convolutional neural network) to identify relevant event attributes and event criteria. As will be appreciated, the event attributes and event criteria may include a variety of formats such that the event attributes and event criteria may be unstructured. Thus, the pre-processing model may be configured to apply extraction techniques to unstructured event attributes and event criteria to extract useful, structured, event attributes and event criteria.

Finally, as shown by operation 404, the apparatus 200 includes means, such as processor 202, memory 204, communications hardware 206, detection circuitry 208, or the like, for generating, the event attribute set and the event criteria set. In some embodiments, the detection circuitry 208 may receive the event attributes and event criteria from communications hardware 206 and analyze the both to generate the user attribute set. In some embodiments, only a subset of the event attributes and event criteria may be included in the event attribute set and event criteria set. The subset of event attributes and event criteria to be included may be determined based on historical analyses performed by the detection circuitry 208 for the same type of digital identity selection event.

Returning to FIG. 3, as shown by operation 304, the apparatus 200 includes means such as processor 202, memory 204, communications hardware 206, multimodal engine 210, or the like, for determining, based on the event attribute set, a master digital identity associated with the user, wherein the master digital identity comprises one or more user digital identities. The one or more user digital identities may comprise pre-existing user digital identities and any bespoke digital identities previously created by the user. The processor 202 may initiate the process by identifying the event attribute set associated with the digital identity selection event. In some embodiments, this may also involve assessing the criteria relevant to the event, such as location, time, and type of digital identity selection event. The processor 202 may communicate with memory 204 to retrieve user digital identities stored on a centralized distributed ledger. These user digital identities are associated with the extracted event attributes and may have been previously stored during interactions related to similar digital identity selection events. The multimodal engine 210 may receive the retrieved user digital identities and process them from various modes (e.g., biometric, behavioral, or contextual). In other words, the multimodal engine 210 may harmonize these diverse data sources to create a unified representation of all user parameters for all the user digital identities. Authenticated user parameters, including biometric data or verified personal details may be extracted from each user digital identity, following which the multimodal engine 210 may integrate these user parameters into a cohesive set, ensuring the inclusion of all relevant and authenticated information. The processor 202 may deploy a master digital identity formation algorithm that stores instructions for consolidating the harmonized user parameters and generating a master digital identity that reflects the user's relevant digital identities within the context of the identified event attributes. In some embodiments, more than one master digital identity may be generated for different entities or the same entity, and may be stored in memory 204. Throughout operation 304, communications hardware 206 may facilitate seamless data flow between the processor 202, memory 204, and multimodal engine 210, thereby allowing for the retrieval, processing, and integration of data needed to determine the master digital identity. The resulting master digital identity may be stored in memory 204 for future use or may be used for immediate application, such as in the authentication process or personalized service delivery.

Figure 5:
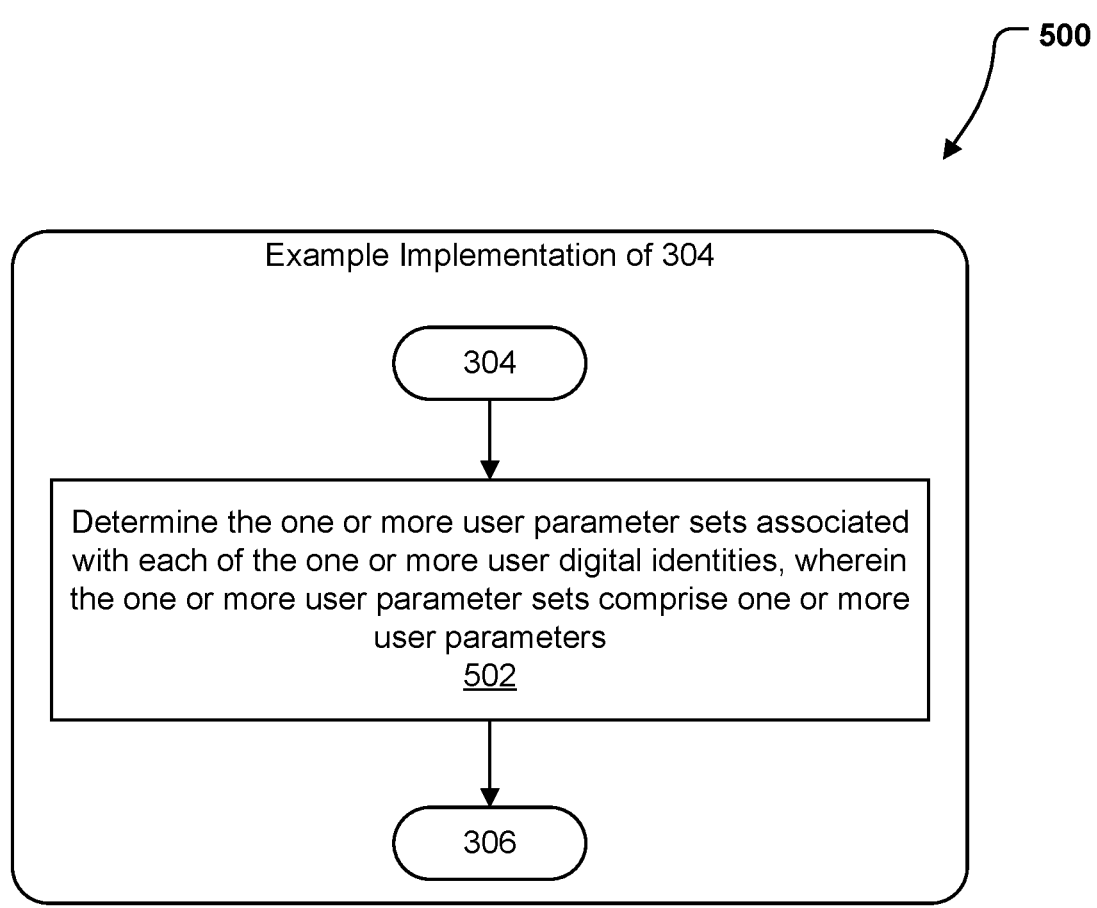
FIG. 5 illustrates another example flowchart for identifying a master digital identity, in accordance with some example embodiments described herein.

In some embodiments, operation 304 may be performed in accordance with the operations described in FIG. 5. Turning now to FIG. 5, a procedure 500 illustrates example operations for determining, based on the event attribute set, a master digital identity associated with the user, wherein the master digital identity comprises one or more user digital identities.

Finally, as shown by operation 502, the apparatus 200 includes means, such as processor 202, memory 204, communications hardware 206, multimodal engine 210, or the like, for identifying, by the multimodal engine, the one or more user parameter sets associated with each of the one or more user digital identities, wherein the one or more user parameter sets comprise one or more user parameters. The multimodal engine 210 may receive input from a distributed centralized leger that stores user digital identities. The input may include biometric data (e.g., fingerprints or facial recognition), behavioral data (e.g., keystroke dynamics, voice patterns), contextual data (e.g., location, time), financial data (e.g., credit card information), etc. In some embodiments the multimodal engine 210, in conjunction with processor 202, may process each mode of data separately, employing algorithms and machine learning models specific to each type. For biometric data, the multimodal engine 210 may use recognition algorithms; for behavioral data, it may analyze patterns and deviations; and for contextual data, it may consider environmental factors. Following data processing, the multimodal engine 210 may retrieve feature extraction techniques via communications hardware 206 that are stored in memory 204, to distill relevant information from each mode of data. This may involve identifying unique characteristics, patterns, or markers within the user digital identities that contribute to the user's digital identity. Normalization techniques may also be applied to ensure consistency across different modes of data. The multimodal engine 210 may then harmonize the information to create a unified representation, and address any variations in data formats, scales, or units. Based on the processed data, the multimodal engine 210 may form distinct sets of user parameters for each mode of data. These user parameter sets may encapsulate the extracted user parameters specific to different aspects of user information (e.g., personal identifying information, biometric, behavioral, etc.). The multimodal engine 210 may integrate the generated user parameter sets into a cohesive representation that collectively define the user's digital identity for multiple contexts. In some embodiments, the one or more user parameter sets may comprise at least one or more of authenticated parameters, unauthenticated parameters, and obfuscated parameters. In particular, the integration of authenticated parameters may be performed by subjecting user parameters to verification and authentication processes that may involve comparing the user parameters against stored reference data or predefined thresholds to ensure accuracy and reliability. The multimodal engine 210 may then associate the verified user parameter sets with their respective user digital identities, wherein each user parameter set corresponds to a specific user digital identity, and this association may be crucial for maintaining context-specific information tied to the identified event attributes. The processed and integrated user parameters may then contribute to the formation of the master digital identity that encompasses all authenticated user parameters derived from multiple modes of data.

Returning to FIG. 3, as shown by operation 306, the apparatus 200 includes means such as processor 202, memory 204, communications hardware 206, multimodal engine 210, or the like, for generating, based on the master digital identity, one or more bespoke digital identities. The one or more bespoke digital identities may refer to uniquely tailored and individualized representations of a user's identity, and generated based on specific attributes, preferences, and parameters derived from a master digital identity. Bespoke digital identities are customized to align with contextual factors, security requirements, and distinctive preferences of the user, offering a personalized and secure approach across diverse interactions and contexts.

Figure 6A:
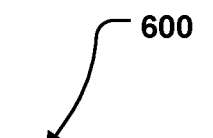
FIG. 6A illustrates an example flowchart for generating one or more bespoke digital identities, in accordance with some example embodiments described herein.
Figure 6A:
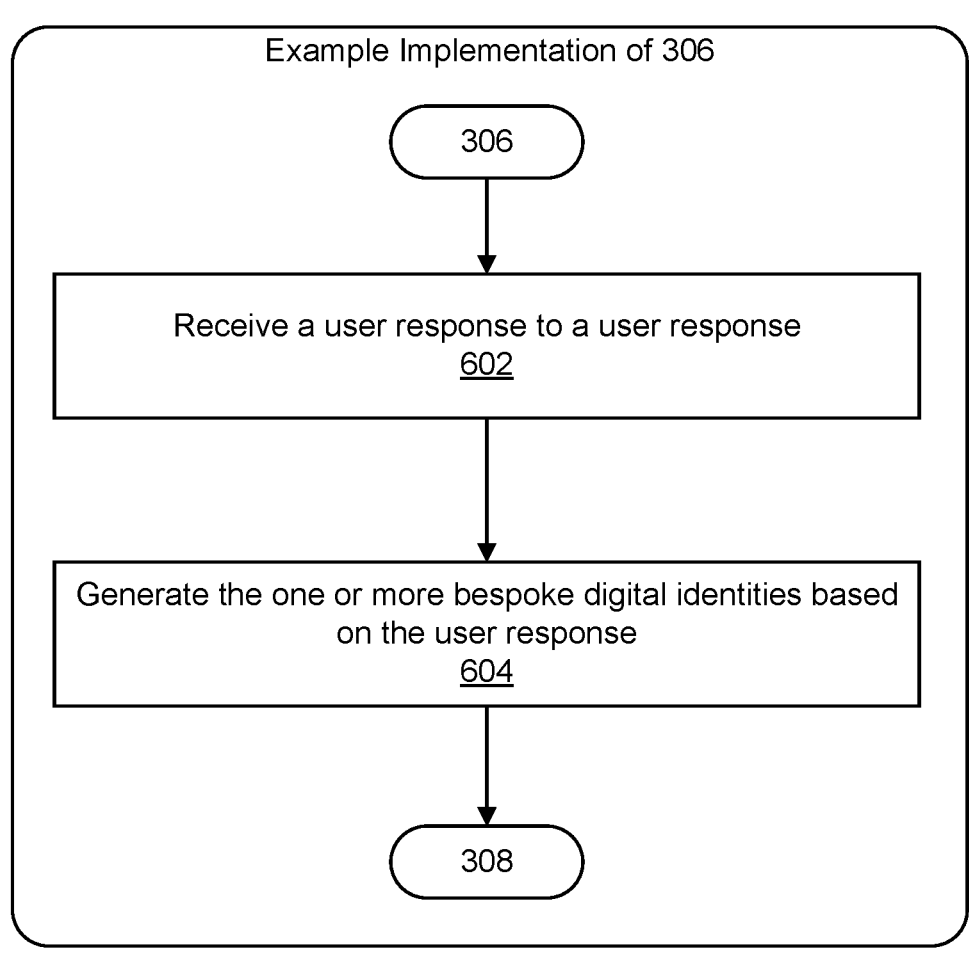
Figure 6B:
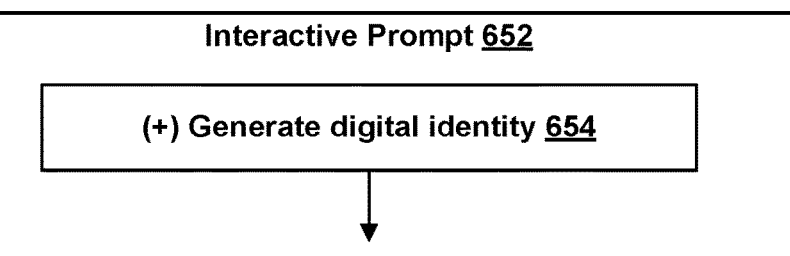
FIG. 6B illustrates an example user interface illustrating an interactive prompt used in some example embodiments described herein.
Figure 6B:
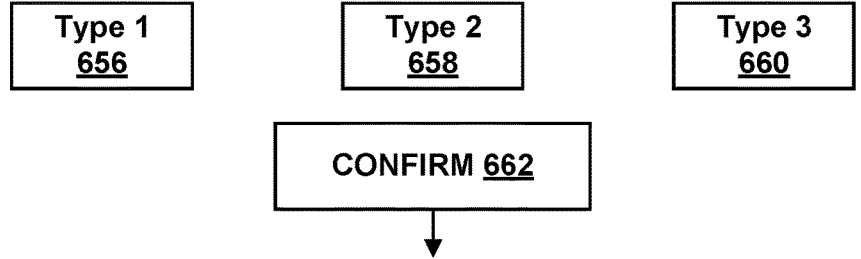

In some embodiments, operation 306 may be performed in accordance with the operations described in FIG. 6A and the corresponding graphical user interface of FIG. 6B. Turning now to FIGS. 6A-6B, a procedure 600 and a graphical user interface 650 illustrate example operations for generating, based on the master digital identity, one or more bespoke digital identities.

As shown by operation 602, the apparatus 200 includes means, such as processor 202, memory 204, communications hardware 206, multimodal engine 210, or the like, for receiving a user response to an interactive prompt 652, wherein the user response includes one or more bespoke parameter sets comprising one or more bespoke parameters, wherein each of the one or more bespoke parameters are assigned a status designation. In some embodiments, the bespoke parameter prompt may include all user parameters stored in the master digital identity. Users may select from these preexisting parameters to generate a bespoke digital identity, but may also generate customized parameters from the preexisting parameters, or entirely new user parameters to incorporate in a new bespoke digital identity. The processor 202 may initiate an interactive prompt 652, prompting the user to generate a bespoke digital identity 654. The user may indicate the type 656-660 of digital identity selection event for which they would like to generate a digital identity (e.g., health, financial, entertainment, etc.) and confirm 662 their selection, which would then allow them to select the parameters they would like to include as part of this digital identity. Based on the selection of the type of digital identity selection event, the multimodal engine 210 may already have populated the parameter set with relevant parameters (e.g., parameters 1-4). In some embodiments, the user may be provided with an option to generate a custom parameter. As exemplified in the table of FIG. 6B, the user may indicate which parameters they would like to include as part of a bespoke parameter set by selecting "Y" or "N", wherein "Y" represents "yes" and includes the parameter in the parameter set for a given digital identity, and "N" represents "no" and does not include the parameter in the parameter set. The user may also be presented with the option for status designation, wherein the user may indicate whether they would like a certain user parameter to be incorporated in its true, authentic state (i.e., using the real value), or in a false, obfuscated state. This option may only be presented for the user parameters the user has indicated "Y" for inclusion in the user parameter set. Should the user have any specific access rules for a user parameter, they may also define these rules as part of the user response. Examples of access rules may include specifying the entities (e.g., establishments or secondary users) that may be authorized to access the digital identity being generated. Once all the selections have been made, the user may submit to generate 762 the bespoke digital identity.

Once the user response has been submitted, communications hardware 206 may facilitate the secure transmission of the user response from the user devices 110A-110N to the processor 202 for further processing. The processor 202 may store the received user response and bespoke parameter sets in memory 204 for further processing, allowing for efficient retrieval and reference during future interactions. The multimodal engine 210 may process the bespoke parameter sets, employing algorithms and machine learning models specific to the various modes of data (e.g., text, voice, and biometrics) and extract relevant features and characteristics from each bespoke parameter. The multimodal engine 210 may also normalize the extracted features to ensure consistency across different data modes, and then validate the bespoke parameters to confirm their adherence to predefined criteria and standards.

Finally, as shown by operation 604, the apparatus 200 includes means, such as processor 202, memory 204, communications hardware 206, multimodal engine 210, or the like, for generating, using the digital identity selection model, and based on the user response, the one or more bespoke digital identities. The processor 202 may initialize a digital identity selection model, specifying the criteria for generating the bespoke digital identities based on the parameters, user preferences, and status designation as indicated in the user response. The processor 202 may apply the digital identity selection model to the integrated user parameters to generate one or more bespoke digital identities. These identities may be tailored to meet the user's specific requirements and the context of the digital identity selection event. The multimodal engine 210 may update the master digital identity to include the one or more bespoke digital identities generated, and may also generate a non-fungible token for each of the one or more bespoke digital identities. In some embodiments, the generation of the non-fungible token may occur as follows: (i) generating a digital signature unique to each bespoke digital identity that serves as a cryptographic representation of the identity, (ii) performing a hashing technique on the generated digital signature through which the generate digital signature is converted into a fixed-size string of characters, and/or the like. This hashed value may become the basis for the non-fungible token. The multimodal engine 210 may the combine the hashed value with metadata associated with the bespoke digital identity and apply tokenization algorithms to create a non-fungible token for each bespoke digital identity. These non-fungible tokens (NFTs) may be linked to a centralized distributed ledger system (e.g., blockchain), wherein each NFT becomes associated with a unique identifier on the blockchain. In some embodiments within a blockchain environment, smart contracts may be employed to handle token creation, ownership transfers, or any other predefined actions associated with the non-fungible tokens. The multimodal engine 210 may also integrate access control mechanisms within the non-fungible token (e.g., specifying permissions, privacy settings, usage restrictions, etc.)

Returning to FIG. 3, as shown by operation 308, the apparatus 200 includes means such as processor 202, memory 204, communications hardware 206, selection engine 212, or the like, for selecting, using a digital identity selection model, an optimal digital identity, wherein the optimal digital identity satisfies the one or more event criteria of the event criteria set. For instance, if the type of a given digital identity selection event was financial, the event criteria set may include factors such as credit card information, age of the user, name of the user, and/or the like. The selection engine 212 may initialize the digital identity selection model, specifying the event criteria. Based on the user digital identities and bespoke digital identities in the master digital identity, the digital identity selection model may evaluate each of these to identify the digital identities that best align with the event criteria set. For example, the digital identity selection model may select the digital identity associated with higher security measures, tailored spending limits, and authenticated parameters required for financial transactions. The selected optimal digital identity may then be outputted to authorize the financial transaction.

Figure 7A:
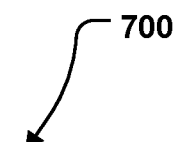
FIG. 7A illustrates an example flowchart for selecting an optimal digital identity that satisfies event criteria, in accordance with some example embodiments described herein.
Figure 7A:
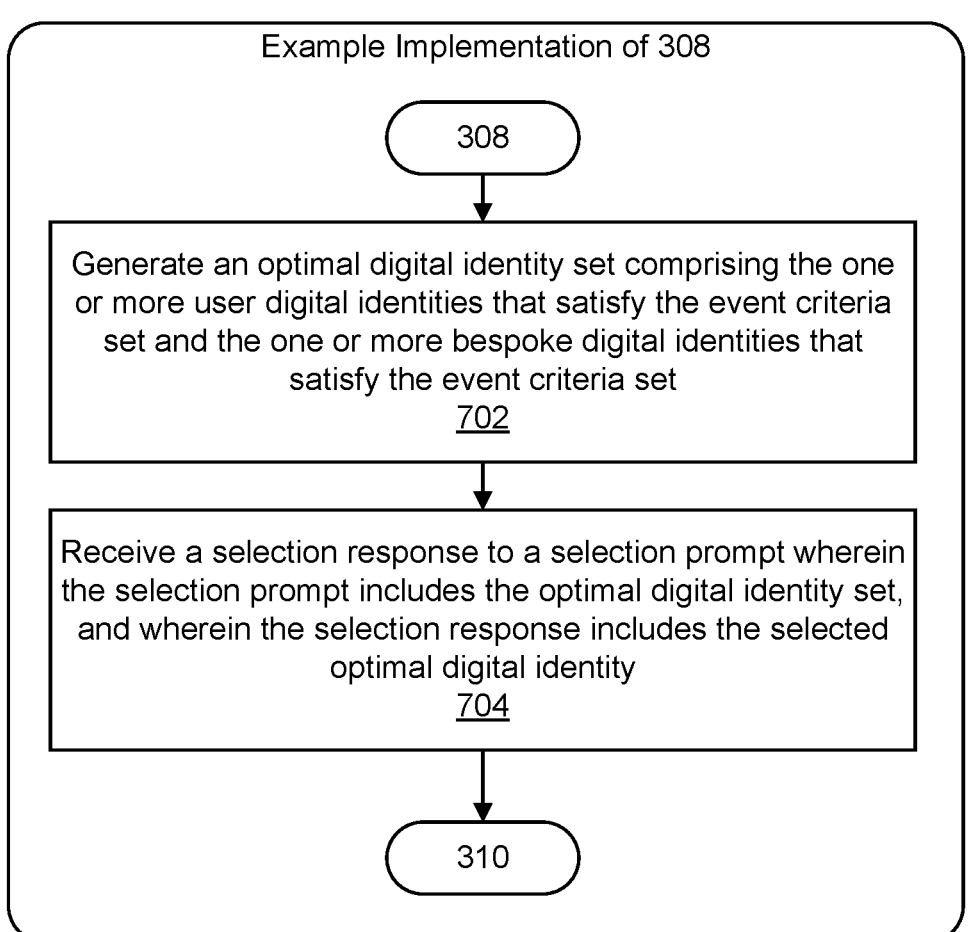

In some embodiments, operation 308 may be performed in accordance with the operations described in FIG. 7A and the corresponding graphical user interface of FIG. 7B. Turning now to FIGS. 7A-7B, a procedure 700 and a graphical user interface 750 illustrate example operations for selecting, using a digital identity selection model, an optimal digital identity, wherein the optimal digital identity satisfies the one or more event criteria of the event criteria set.

As shown by operation 702, the apparatus 200 includes means, such as processor 202, memory 204, communications hardware 206, selection engine 212, or the like, for generating, using the digital identity selection model, an optimal digital identity set, wherein the optimal digital identity set comprises (i) the one or more user digital identities that satisfy the event criteria set and (ii) the one or more bespoke digital identities that satisfy the event criteria set. In some embodiments, the processor 202 may initialize a digital identity selection model to interpret the event criteria set for a given digital identity selection event. The communications hardware 206 may facilitate the retrieval of relevant data from the master digital identity stored in memory 204. The data may encompass the user digital identities and bespoke digital identities associated with the event criteria set. In some embodiments, the selection engine 212 may be equipped with multimodal processing capabilities and employ techniques such as natural language processing, textual pattern recognition, and/or the like to determine the digital identities that are linked to the digital identity selection event. For example, the selection engine 212 may search for keywords related to "health" and "medical conditions" for a digital identity selection event that involves a user visiting a physician for an annual checkup. In this case, relevant digital identities may include personal identifying information (e.g., name of the patient, their age, date of birth, address, etc.) and previous medical history. The selection engine 212 may choose to exclude the digital identities associated with credit card information as that information may not be required for a health specific context. In some embodiments, the digital identity selection model may adapt and learn from previous digital identity selections to determine the optimal digital identity set. Once all digital identities are identified, the selection engine 212, in conjunction with the digital identity selection model may extract the optimal digital identities from the master digital identity and store them in an optimal digital identity set.

The determination of whether a digital identity is optimal relies on various factors and considerations aligned with the specific event criteria. The selection engine 212 and digital identity selection model may use sophisticated analyses and methods to make this assessment. Examples of such methods may include: (i) event criteria alignment (e.g., determining whether a digital identity satisfies the conditions set for a digital identity selection event), (ii) security and authentication levels (e.g., higher levels of authentication may contribute to an identity being deemed more optimal for sensitive transactions), (iii) user preferences and history (e.g., if a digital identity aligns with a user's historical choices and preferences, it may be considered optimal for that user), (iv) transaction history (e.g., if a particular digital identity has had a successful and secure transaction history, it may be prioritized), (v) contextual awareness (e.g., if a user often conducts financial transactions from a specific location, a digital identity associated with that context may be considered optimal), (vi) behavioral analysis (e.g., a digital identity that aligns with expected user behavior, such as access times or usage frequency is more likely to be deemed optimal), (vii) real-time risk assessment (e.g., if an identity exhibits characteristics indicative of lower risk, it may be considered more optimal for a digital identity selection event), (viii) privacy and consent (e.g., if a digital identity aligns with user-specified privacy preferences, it is more likely to be deemed optimal).

Finally, as shown by operation 704, the apparatus 200 includes means, such as processor 202, memory 204, communications hardware 206, selection engine 212, or the like, for receiving a selection response to a selection prompt 752, wherein the selection prompt 752 includes the optimal digital identity set 764, and wherein the selection response includes the selected optimal digital identity. The communications hardware 206 may initiate the creation of a selection prompt 752 that includes the optimal digital identity set 764 and is presented to the user through a secure interface. In some embodiments, the optimal digital identity set may be presented in a tabular format, and may include the optimal digital identity set and the user parameters associated with each optimal digital identity. The user may select and submit 760 an optimal digital identity from the optimal digital identities 754-758 that are provided, or may choose to modify their selection by manually selecting an alternative optimal digital identity. In some embodiments, the selected optimal digital identity, as part of the selection response may be securely transmitted back to the system via communications hardware 206. The processor 202 may store the received selection response in memory 204. This information may contribute to ongoing user profiles and help improve future digital identity selections. The digital identity selection model may also dynamically adapt and improve itself based on the user's selection and any provided feedback.

Figure 8B:
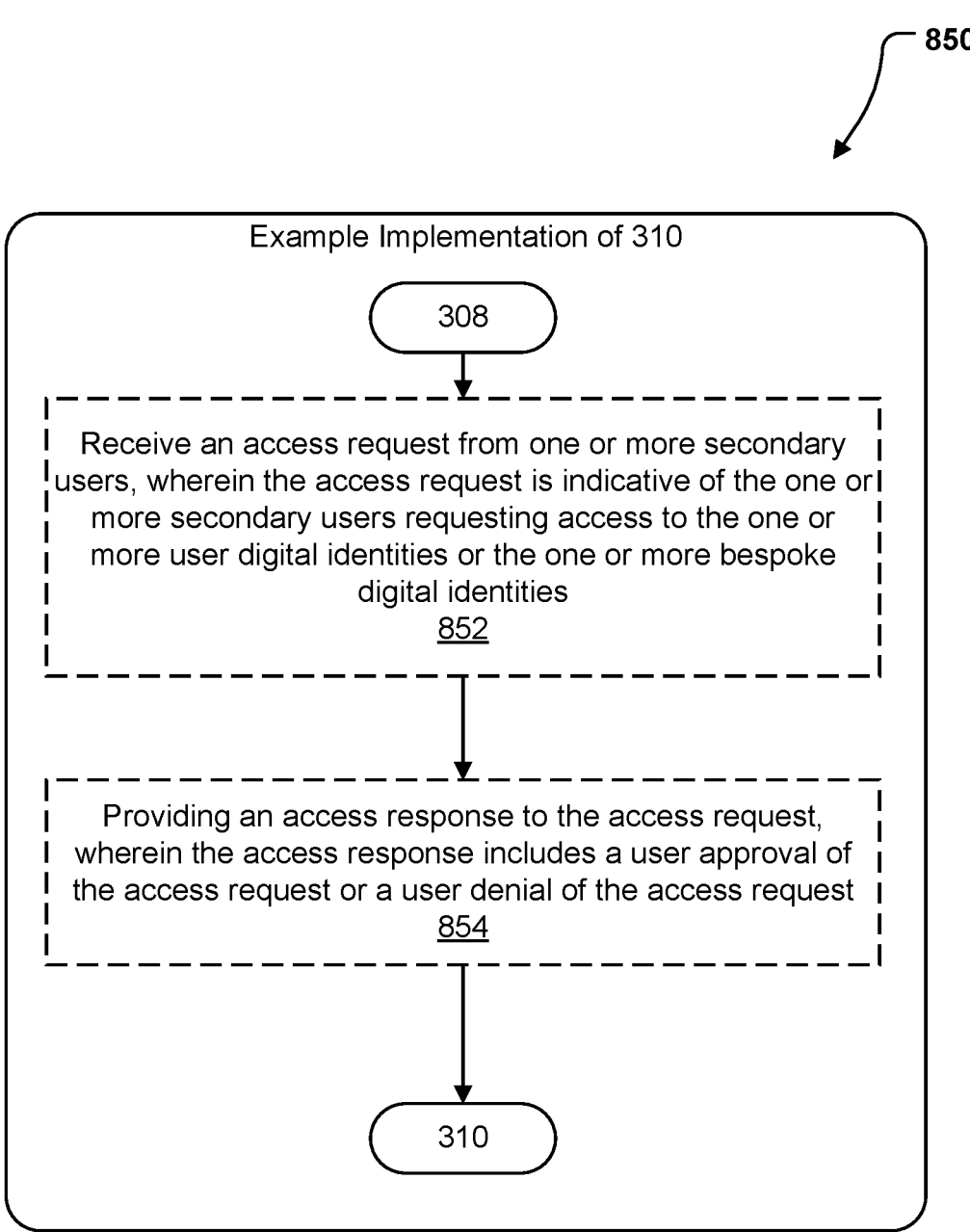
FIG. 8B illustrates a secondary example flowchart for outputting the optimal digital identity, in accordance with some example embodiments described herein.

Returning to FIG. 3, as shown by operation 310, the apparatus 200 includes means such as processor 202, memory 204, communications hardware 206, or the like, for outputting the optimal digital identity. In some embodiments, operation 310 may be performed in accordance with the operations described in FIG. 8A and the example operations of FIG. 8B. Turning now to FIGS. 8A-8B, a procedure 800 and 850 illustrate example operations for outputting the optimal digital identity.

Finally, as shown by operation 802, the apparatus 200 includes means, such as processor 202, memory 204, communications hardware 206, or the like, for providing, by communications hardware, access of the optimal digital identity to one or more entities, wherein the one or more entities comprise at least one of (i) an establishment, or (ii) one or more entities, wherein the access is provided in an instance in which the one or more entities satisfies at least one of (i) a smart contract and (ii) one or more access rules. Each digital identity of the user, including the master digital identity may be recorded as a non-fungible token (NFT) on the blockchain. The user may control access of entities to various NFTs which correspond to a particular digital identity of the user. A grant of access to a particular NFT of a user may be enforced with a smart contract and may be associated with a time frame, after which the access to the NFT is revoked for the entity. A user may control access to various digital identities in a variety of ways, such as via an associated online portal, application, or the like. In some examples, the user may request a QR code to be generated for a digital identity and the QR code may link to an NFT associated with the specific digital identity. Once an entity scans this QR code, the entity may be granted access to NFT for a limited time (as enforced by the smart contract). The QR code may only be valid for a limited number of scans or a limited time and a new QR code may be generated for each user request such that a single QR code cannot be scanned multiple times to prevent unauthorized access.

A smart contract may be deployed on a blockchain network that facilitates digital identity transactions and includes predefined conditions for access, such as specific events or criteria that entities must meet. In an instance in which the event criteria are met, the smart contract may trigger the communications hardware 206 to provide access to the optimal digital identity. In some embodiments, the execution of this process may occur autonomously on the blockchain to ensure transparency and security. The communications hardware 206 may securely transmit the optimal digital identity to the authorized entities, meeting the conditions set by the smart contract. Alternatively, access rules may be predefined within the system by the user, specifying under what conditions entities may access an optimal digital identity. In some embodiments, these access rules may be configured in a centralized manner. For instance, if a user submits a request to share a digital identity with a particular entity, the digital identity selection system 102 may evaluate the event against the access rules. If the conditions are met, the communications hardware 206 may be triggered to initiate the process of providing access to the authorized entities as defined by the access rules.

Turning now to FIG. 8B, the apparatus 200 includes means, such as processor 202, memory 204, communications hardware 206, multimodal engine 210, or the like, for outputting a user digital identity or bespoke digital identity, particularly in response to an access request initiated by an entity (e.g., establishment or secondary user). This may occur in instances, wherein the optimal digital identity outputted to the entity was incorrect or missing important criteria required to follow through with a transaction. Such a situation may thus require the entity to submit an access request to the user so that they may be provided with a different user digital identity or bespoke digital identity that meets the event criteria.

As shown by operation 852, the apparatus 200 includes means, such as processor 202, memory 204, communications hardware 206, or the like, for receiving an access request from one or more entities, wherein the access request is indicative of the one or more entities requesting access to the one or more user digital identities or the one or more bespoke digital identities. The access request may be initiated by processor 202 in scenarios where an entity seeks to access a digital identity and use it in a manner that may against a smart contract or user access rules. For example, a digital identity of the user may be associated with three financial accounts, but the user may only authorize the entity access to one financial account and may set a spending limit (e.g., 20 dollars a week) on the account usage. If the entity seeks to spend $50, the access rules may be retrieved from memory 204 and used by communications hardware 206 to generate an access request and output the access request to the user, which the user may deny or approve of.

The digital identity management system 102 may allow a user to designate one or more entities (e.g., spouse, child, parent, sibling, friend, organization A, etc.) as trusted, and allow them access to certain information within a particular digital identity. In some embodiments, an entity may also be associated with one or more digital identities, which may be used to authenticate the entity. Alternatively, the entity may not be associated with any digital identities and the digital identity management system may store the information of an entity's digital identity within a digital identity of the user or may generate a proxy digital identity for the entity that is linked to a digital identity of the user. In some embodiments, the proxy digital identity of the entity may be used to authenticate the entity in an instance in which they attempt to use the user digital identity.

Finally, as shown by operation 854, the apparatus 200 includes means, such as processor 202, memory 204, communications hardware 206, or the like, for providing an access response to the access request, wherein the access response includes a user approval of the access request or a user denial of the access request. In an instance in which an entity attempts to use the digital account of the user, the digital identity management system may retrieve the smart contract or access rules stored in memory 204 and use an evaluation algorithm deployed by processor 202, to determine whether this usage is allowed based on the smart contract and access rules associated with the particular digital identity. When a notification (e.g., access request) of this usage or attempted usage may be provided to the user, they may approve or deny the request via communications hardware 206.

FIGS. 3-8B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide technical solutions for digital identity selection for a particular digital identity selection event. Such solutions have previously not been used, and are only achievable by harnessing the computational capabilities and widespread data accessibility offered by modern internet connectivity. Example embodiments address the challenges associated with the manual selection and comparison of digital identities within identity management apps, presenting an opportunity to leverage a distributed centralized ledger system for enhanced security and user control. The decentralized nature of the ledger reduces vulnerabilities, ensuring that the digital identity selection system remains robust and resilient against potential attacks or single points of failure. In addition, by automating the manual digital identity comparison and selection processes, these embodiments significantly diminish the likelihood of suboptimal digital identity choices for a particular digital identity selection event that could compromise user privacy and security. Furthermore, example embodiments offer efficiency gains by leveraging a digital identity selection model that uses machine learning, reducing the time and resources required for optimal digital identity selection. In eliminating the potential for human error in manual identity management and selection, example embodiments significantly introduce a level of speed and consistency in identifying an optimal digital identity for each digital identity selection event-a functionality that was historically impractical to achieve systematically.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for digital identity selection, the method comprising:

detecting, by detection circuitry, a digital identity selection event for a user, wherein the digital identity selection event is associated with an event attribute set comprising one or more event attributes, and an event criteria set comprising one or more event criteria that an entity requires from the digital identity provided during the digital identity selection event, wherein the event attribute set comprises an indication of a context of the digital identity selection event, wherein the event attribute set facilitates the digital identity selection for the user based on a particular event attribute associated with the digital identity selection event;

determining, by a multimodal engine and based on the event attribute set, a master digital identity associated with the user, wherein the master digital identity comprises one or more user digital identities;

generating, by the multimodal engine and based on the master digital identity, one or more bespoke digital identities;

selecting, by a selection engine and using a digital identity selection model, an optimal digital identity, wherein the optimal digital identity satisfies the one or more event criteria of the event criteria set; and outputting, by communications hardware, the optimal digital identity.

2. The method of claim 1, wherein detecting the digital identity selection event further comprises:

extracting, by the detection circuitry, the one or more event attributes and the one or more event criteria from a data environment; and generating, by the detection circuitry, the event attribute set and the event criteria set.

3. The method of claim 1, wherein determining the master digital identity further comprises:

identifying, by the multimodal engine, the one or more user parameter sets associated with each of the one or more user digital identities, wherein the one or more user parameter sets comprise one or more user parameters.

4. The method of claim 1, wherein generating the one or more bespoke digital identities further comprises:

receiving, by communications hardware, a user response to an interactive prompt, wherein the user response includes one or more bespoke parameter sets comprising one or more bespoke parameters, wherein each of the one or more bespoke parameters are assigned a status designation; and generating, by the multimodal engine and using the digital identity selection model, and based on the user response, the one or more bespoke digital identities.

5. The method of claim 1, wherein selecting the optimal digital identity further comprises:

generating, by the selection engine and using the digital identity selection model, an optimal digital identity set, wherein the optimal digital identity set comprises (i) the one or more user digital identities that satisfy the event criteria set and (ii) the one or more bespoke digital identities that satisfy the event criteria set; and receiving, by communications hardware, a selection response to a selection prompt, wherein the selection prompt includes the optimal digital identity set, and wherein the selection response includes the selected optimal digital identity.

6. The method of claim 1, wherein outputting the optimal digital identity further comprises:

providing, by communications hardware, access of the optimal digital identity to one or more entities, wherein the access is provided in an instance in which the one or more entities satisfies at least one of (i) a smart contract and (ii) one or more access rules.

7. The method of claim 6, further comprising:

receiving, by communications hardware, an access request from the one or more entities, wherein the access request is indicative of the one or more entities requesting access to the one or more user digital identities or the one or more bespoke digital identities; and providing, by communications hardware, an access response to the access request, wherein the access response includes a user approval of the access request or a user denial of the access request.

8. An apparatus for digital identity selection, the apparatus comprising:

detection circuitry configured to:

detect a digital identity selection event for a user, wherein the digital identity selection event is associated with an event attribute set comprising one or more event attributes, and an event criteria set comprising one or more event criteria that an entity requires from the digital identity provided during the digital identity selection event, wherein the event attribute set comprises an indication of a context of the digital identity selection event, wherein the event attribute set facilitates the digital identity selection for the user based on a particular event attribute associated with the digital identity selection event;

a multimodal engine configured to:

determine, based on the event attribute set, a master digital identity associated with the user, wherein the master digital identity comprises one or more user digital identities, and generate, based on the master digital identity, one or more bespoke digital identities;

a selection engine configured to:

select, using a digital identity selection model, an optimal digital identity, wherein the optimal digital identity satisfies the one or more event criteria of the event criteria set; and communications hardware configured to:

output the optimal digital identity.

9. The apparatus of claim 8, wherein the detection circuitry is further configured to:

extract the one or more event attributes and the one or more event criteria from a data environment; and generate the event attribute set and the event criteria set.

10. The apparatus of claim 8, wherein the multimodal engine is further configured to:

determine the one or more user parameter sets associated with each of the one or more user digital identities, wherein the one or more user parameter sets comprise one or more user parameters.

11. The apparatus of claim 8, wherein the communications hardware is further configured to receive a user response to an interactive prompt, wherein the user response includes one or more bespoke parameter sets comprising one or more bespoke parameters, wherein each of the one or more bespoke parameters are assigned a status designation, wherein the multimodal engine is further configured to generate, using the digital identity selection model and based on the user response, the one or more bespoke digital identities.

12. The apparatus of claim 8, wherein the selection engine is further configured to generate, using the digital identity selection model, an optimal digital identity set, wherein the optimal digital identity set comprises (i) the one or more user digital identities that satisfy the event criteria set, and (ii) the one or more bespoke digital identities that satisfy the event criteria set, wherein the communications hardware is further configured to receive a selection response to a selection prompt, wherein the selection prompt includes the optimal digital identity set, and wherein the selection response includes the selected optimal digital identity.

13. The apparatus of claim 8, wherein the communications hardware is further configured to:

provide access of the optimal digital identity to one or more entities, wherein the access is provided in an instance in which the one or more entities satisfies at least one of (i) a smart contract and (ii) one or more access rules.

14. The apparatus of claim 13, wherein:

the communications hardware is further configured to receive an access request from the one or more entities, wherein the access request is indicative of the one or more entities requesting access to the one or more user digital identities or the one or more bespoke digital identities; and the communications hardware is further configured to provide an access response to the access request, wherein the access response includes a user approval of the access request or a user denial of the access request.

15. A computer program product for digital identity selection, the computer program comprising at least one non-transitory computer readable storage medium storing software instructions that, when executed, cause an apparatus to:

detect a digital identity selection event for a user, wherein the digital identity selection event is associated with an event attribute set comprising one or more event attributes, and an event criteria set comprising one or more event criteria that an entity requires from the digital identity provided during the digital identity selection event, wherein the event attribute set comprises an indication of a context of the digital identity selection event, wherein the event attribute set facilitates the digital identity selection for the user based on a particular event attribute associated with the digital identity selection event;

determine, based on the event attribute set, a master digital identity associated with the user, wherein the master digital identity comprises one or more user digital identities, generate, based on the master digital identity, one or more bespoke digital identities;

select, using a digital identity selection model, an optimal digital identity, wherein the optimal digital identity satisfies the one or more event criteria of the event criteria set; and output the optimal digital identity.

16. The computer program product of claim 15, wherein the software instructions, when executed, further cause the apparatus to:

extract the one or more event attributes and the one or more event criteria from a data environment; and generate the event attribute set and the event criteria set.

17. The computer program product of claim 15, wherein the software instructions, when executed, further cause the apparatus to:

determine the one or more user parameter sets associated with each of the one or more user digital identities, wherein the one or more user parameter sets comprise one or more user parameters.

18. The computer program product of claim 15, wherein the software instructions, when executed, further cause the apparatus to:

receive a user response to an interactive prompt, wherein the user response includes one or more bespoke parameter sets comprising one or more bespoke parameters, wherein each of the one or more bespoke parameters are assigned a status designation; and generate, using the digital identity selection model and based on the user response, the one or more bespoke digital identities.

19. The computer program product of claim 15, wherein the software instructions, when executed, further cause the apparatus to:

generate, using the digital identity selection model, an optimal digital identity set, wherein the optimal digital identity set comprises (i) the one or more user digital identities that satisfy the event criteria set, and (ii) the one or more bespoke digital identities that satisfy the event criteria set; and receive a selection response to a selection prompt, wherein the selection prompt includes the optimal digital identity set, and wherein the selection response includes the selected optimal digital identity.

20. The computer program product of claim 15, wherein the software instructions, when executed, further cause the apparatus to:

provide access of the optimal digital identity to one or more entities, wherein the access is provided in an instance in which the one or more entities satisfies at least one of (i) a smart contract and (ii) one or more access rules.

\* \* \* \* \*